United States Patent
Bai et al.

(10) Patent No.: US 8,842,389 B2
(45) Date of Patent: Sep. 23, 2014

(54) WRAP-AROUND SHIELDED WRITER WITH HIGHLY HOMOGENEOUS SHIELD MATERIAL

(75) Inventors: Zhigang Bai, Milpitas, CA (US); Yan Wu, Cupertino, CA (US); Moris Dovek, San Jose, CA (US); Cherng Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 703 days.

(21) Appl. No.: 12/589,597

(22) Filed: Oct. 26, 2009

(65) Prior Publication Data

US 2011/0097601 A1    Apr. 28, 2011

(51) Int. Cl.
*G11B 5/11* (2006.01)
*G11B 5/31* (2006.01)
*G11B 5/127* (2006.01)

(52) U.S. Cl.
CPC ............ *G11B 5/3163* (2013.01); *G11B 5/1278* (2013.01); *G11B 5/315* (2013.01)
USPC ........................................ 360/125.3; 360/128

(58) Field of Classification Search
CPC .... G11B 5/1278; G11B 5/3116; G11B 5/315; G11B 5/11; G11B 5/23
USPC ............................................... 360/125.3, 128
See application file for complete search history.

(56) References Cited

U.S. PATENT DOCUMENTS

| | | | | |
|---|---|---|---|---|
| 4,656,546 A | * | 4/1987 | Mallory | 360/110 |
| 4,935,832 A | * | 6/1990 | Das et al. | 360/112 |
| 5,075,956 A | * | 12/1991 | Das | 29/603.14 |
| 5,606,478 A | * | 2/1997 | Chen et al. | 360/119.07 |
| 5,680,283 A | * | 10/1997 | Tanaka et al. | 360/125.03 |
| 5,854,727 A | * | 12/1998 | Tanaka et al. | 360/125.03 |
| 6,524,730 B1 | * | 2/2003 | Chen | 428/811.3 |
| 6,738,233 B2 | * | 5/2004 | Khizroev et al. | 360/319 |
| 6,791,793 B1 | * | 9/2004 | Chen et al. | 360/125.12 |

(Continued)

FOREIGN PATENT DOCUMENTS

| | | | | |
|---|---|---|---|---|
| JP | 2002288806 A | * | 10/2002 |
| JP | 2007052904 A | * | 3/2007 |
| JP | 2009176399 A | * | 8/2009 |
| JP | 2009199712 A | * | 9/2009 |

OTHER PUBLICATIONS

"New Shielded Single-Pole Head With Planar StrUcture," by Kazuyuki Ise et al., IEEE Transactions on Magnetics, vol. 42, No. 10, Oct. 2006, pp. 2422-2424, Intermag 2006, May 8-12; San Diego.

*Primary Examiner* — Will J Klimowicz
(74) *Attorney, Agent, or Firm* — Saile Ackerman LLC; Stephen B. Ackerman

(57) ABSTRACT

A perpendicular magnetic recording (PMR) head is fabricated with a main pole shielded laterally by a pair of side shields, shielded above by a trailing shield and shielded optionally below by a leading shield. The shields and the seed layers on which they are formed are formed of materials having substantially the same physical characteristics including the same material composition, the same hardness, the same response to processes such as ion beam etching (IBE), chemical mechanical polishing (CMP), mechanical lapping, such as the slider ABS lapping, the same coefficient of thermal expansion (CTE) as well as the same $B_s$. Optionally, the trailing shield may be formed on a high $B_s$ seed layer to provide the write head with improved down-track performance.

10 Claims, 6 Drawing Sheets

(56) References Cited

U.S. PATENT DOCUMENTS

| | | | |
|---|---|---|---|
| 6,954,340 B2 * | 10/2005 | Shukh et al. | 360/317 |
| 7,002,775 B2 * | 2/2006 | Hsu et al. | 360/125.03 |
| 7,042,682 B2 * | 5/2006 | Hu et al. | 360/317 |
| 7,054,105 B2 * | 5/2006 | Mochizuki et al. | 360/125.03 |
| 7,068,453 B2 | 6/2006 | Terris et al. | |
| 7,070,698 B2 * | 7/2006 | Le | 216/22 |
| 7,221,538 B2 * | 5/2007 | Kawato et al. | 360/125.04 |
| 7,239,478 B1 * | 7/2007 | Sin et al. | 360/125.3 |
| 7,289,293 B2 * | 10/2007 | Aoyagi | 360/135 |
| 7,322,095 B2 | 1/2008 | Guan et al. | |
| 7,367,112 B2 | 5/2008 | Nix et al. | |
| 7,440,229 B2 * | 10/2008 | Sasaki et al. | 360/125.22 |
| 7,441,325 B2 | 10/2008 | Gao et al. | |
| 7,606,006 B2 * | 10/2009 | Mochizuki et al. | 360/319 |
| 7,639,450 B2 * | 12/2009 | Hsu et al. | 360/125.02 |
| 7,639,452 B2 * | 12/2009 | Mochizuki et al. | 360/125.15 |
| 7,726,009 B1 * | 6/2010 | Liu et al. | 29/603.11 |
| 7,777,988 B2 * | 8/2010 | Guan et al. | 360/125.3 |
| 7,903,372 B2 * | 3/2011 | Lee et al. | 360/125.3 |
| 8,015,692 B1 * | 9/2011 | Zhang et al. | 29/603.14 |
| 8,064,162 B2 * | 11/2011 | Matsumoto et al. | 360/125.02 |
| 8,149,537 B2 * | 4/2012 | Nazarov | 360/125.3 |
| 8,173,028 B2 * | 5/2012 | Ishizaki et al. | 216/22 |
| 8,201,320 B2 * | 6/2012 | Allen et al. | 29/603.16 |
| 2002/0118487 A1 * | 8/2002 | Yamaguchi et al. | 360/110 |
| 2005/0219743 A1 * | 10/2005 | Guan et al. | 360/125 |
| 2007/0035885 A1 * | 2/2007 | Im et al. | 360/317 |
| 2007/0247748 A1 * | 10/2007 | Ikeda et al. | 360/126 |
| 2009/0154019 A1 | 6/2009 | Hsiao et al. | |
| 2009/0154026 A1 | 6/2009 | Jiang et al. | |
| 2012/0125885 A1 * | 5/2012 | Chen et al. | 216/22 |

* cited by examiner

WRAP-AROUND SHIELDED WRITER WITH HIGHLY HOMOGENEOUS SHIELD MATERIAL

BACKGROUND OF THE INVENTION

1. Field of the Invention

This invention relates to the fabrication of a perpendicular magnetic recording (PMR) write head whose main pole is surrounded on all sides by shields formed of magnetic material. In particular it relates to the formation of such shields using layers of the same magnetic material so that a consistent fabrication process can be employed and so that a corresponding consistent performance can be obtained.

2. Description of the Related Art

The increasing need for high recording area densities (up to 500 Gb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed within a magnetic layer, perpendicular to the disk surface, while a soft magnetic underlayer (SUL) formed beneath the magnetic layer acts as a stabilizing influence on these perpendicular domain structures. Thus, a magnetic recording head that produces a field capable of forming domains perpendicular to a disk surface, when used in conjunction with such perpendicular recording media, is able to produce a stable recording with a much higher area density than is possible using standard longitudinal recording.

Since their first use, the PMR head has evolved through several generations. Initially, the PMR head was a monopole, but that design was replaced by a shielded head design with a trailing edge shield (TS), which provides a high field gradient in the down-track direction to facilitate recording at high linear densities. Side shields (SS) then began to be used in conjunction with the trailing edge shields, because it was necessary to eliminate the fringing side fields in order to increase writing density still further. To further reduce the fringing in the down-track direction, thus reducing the length of the "write bubble" (the iso-field contour) down the track and improving write performance at a skew angle, a leading edge shield (LS) was also proposed, making the write head four-side shielded.

Despite the aforementioned advantages for the four-sided shielded design, it does require additional design optimizations for all the shield layers. It is believed that a high saturation magnetic moment ($B_s$) seed layer, such as CoFe with a $B_s$ of 2.4 T (Tesla), for the TS would improve the down-track field gradient. It is also traditionally believed that the LS and TS are somewhat "non-critical" layers and they are often formed of very low moment material such as permalloy. As a result, there will be a significant mismatch in material compositions and moments for these layers, all of which are exposed at the ABS (air bearing surface) of the write head.

Several issues may arise as a result of materials and moment mismatches. First, the pole tip recession/protrusion may be very different between the layers, as a result of hardness differences between the materials and lapping rate variations during the slider lapping process that defines the final ABS. This may affect the magnetic spacing between the write pole and media during write operation, thereby adversely affecting performance. For example, AFM (atomic force microscopy) images show higher protrusion of the TS/SS seed layer relative to the surrounding materials. The seed layer has a $B_s$=2.2 T, whereas for the TS/SS shield materials themselves $B_s$=1.9 T. Another downside of higher seed layer protrusion could be erasures from the shield corners due to closeness of the seed layers to the media.

Another issue associated with the material/moment mismatches between different shield layers is the formation of domain walls at the layer interfaces that may cause wide area track erasures (WATE). This could be a result of different material magnetostrictions causing different domain configurations in neighboring layers, which, in turn create domain walls at the interfaces, or it could just be due to the moment mismatches producing magnetic charges at the interfaces which produce stray fields.

Magnetic force microscopy applied to shield configurations with WS1 (trailing shield) and PP3 (plated top layer) layers formed of materials having $B_s$=1.8 T and 1.0 T show evidence of domain walls propagating from the MP region upward and stopping at the interface between the materials. On the other hand, wrap-around shield configurations with all shields, SS, WS1 and PP3 made of the same $B_s$ material, show no such domain walls on the ABS and there is no WATE.

An additional disadvantage of using low $B_s$ materials in the LS and pole yoke layers is that in order to conduct the same amount of magnetic flux as a material with twice the value of $B_s$, would require twice the thickness. For example, the use of low $B_s$ Ni$_{80}$Fe$_{20}$ vs. a NiFe, CoFe or CoNiFe alloy with a $B_s$ of about 2.0 T. Larger metal volumes required of the lower $B_s$ metals will cause larger protrusions during temperature increases either due to ambient increases or the heat generated by energizing currents.

Issues relevant to shield materials are described in the prior arts. For example, Terris et al. (U.S. Pat. No. 7,068,453) discloses side and trailing shields formed of a soft magnetic material.

Gao et al. (U.S. Pat. No. 7,441,325) discloses a trailing shield formed of NiFe.

Nix et al. (U.S. Pat. No. 7,367,112) teaches the formation of a main pole with trailing and side shields.

Guan et al. (U.S. Pat. No. 7,322,095, assigned to the present assignee) teaches a wrap-around shield, as do Jiang et al. (US Patent Application 2009/0154026) and Hsiao et al. (US Patent Application 2009/0154019).

None of the prior art cited above address the problem addressed by the present invention nor do they disclose the structures and materials of the present invention.

SUMMARY OF THE INVENTION

A first object of this invention is to reduce the local protrusion of a shield layer due to mismatches in the materials used to form the layers and used to form various structures in the head itself.

A second object of the present invention is to eliminate the formation of domain walls at the interfaces between the TS, SS and LS portions of a four sided magnetic shield due to mismatches in either the materials or their moments, thereby eliminating wide area track erasures (WATE) that are associated with such domain walls.

A third object of the present invention is to reduce the pole tip protrusion for a magnetic writer that uses a low $B_s$ high thickness combination for certain shield layers, such as the LS and TS.

A fourth object of the present invention is to achieve the above stated objects without diminishing the on-track and off-track performance of the head.

A fifth object of the present invention is to use the head so formed and provided within a hard disk drive incorporating a slider mounted read/write head whose head is the head of the present invention, where the slider is mounted on a head gimble assembly within the hard disk drive.

These objects will be achieved by means of a wrap-around shielded write head whose main pole (MP) is surrounded by a TS (trailing shield), an optional LS (leading shield) and two SS's (side shields). Note that in some figures, particularly in an ABS view, the trailing shield, TS is shown as two portions, which are labeled WS1 and PP3. The WS1 (write shield 1) portion is the main part of the TS, whereas the portion labeled PP3 is the ABS portion of the return yoke that completes the magnetic circuit with the main pole.

The non-magnetic write gap (WG) between the MP and the TS, the non-magnetic side gap (SG) between the MP and the SS, and the leading gap (LG) between the MP and the LS, are separately optimized and controlled. The WG is typically 15 to 50 nm, the SG is typically one to ten times the width of the WG and the LG is typically one to twenty times the WG. An important feature of the invention is that all shield layers, LS, TS and SS, including WS1 and PP3, an their respective seed layer, have substantially the same material composition, the same hardness, the same response (eg. removal rate) to processes such as ion beam etching (IBE), chemical mechanical polishing (CMP), mechanical lapping, such as the slider ABS lapping, and the same coefficient of thermal expansion (CTE) as well as the same $B_s$. By "substantially the same," is meant the fact that the physical characteristics (removal rate, CTE, $B_S$) among the various layers and their seeds may have small variations on, the order of 10%, of their respective nominal values. For example, a nominal $B_s$ of 2.0 T could have +/−0.1 T.

DESCRIPTION OF THE PREFERRED EMBODIMENTS

The preferred embodiment of the present invention is a shielded pole structure for use within a perpendicular magnetic recording (PMR) head, in which the shields are all formed of materials having substantially the same physical characteristics including the same material composition, the same hardness, the same response (eg. removal rate) to processes such as ion beam etching (IBE), chemical mechanical polishing (CMP), mechanical lapping, such as the slider ABS lapping, and the same coefficient of thermal expansion (CTE) as well as the same $B_s$. By "substantially the same," is meant the fact that the physical characteristics (removal rate, CTE, $B_S$) among the various layers and their seeds may have small variations on, the order of 10%, of their respective nominal values. For example, a nominal $B_s$ of 2.0 T could have +/−0.1 T.

Figure 1A:
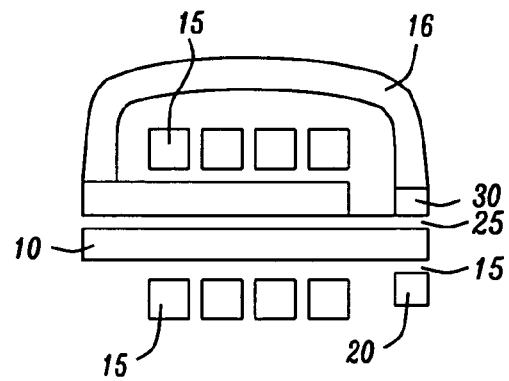
FIG. 1a is a schematic representation of a first embodiment of the present invention showing a side cross-sectional view of an inductive-type write head in which is seen a main pole surrounded by the shields of the present invention at its trailing edge and leading edge, the side shields being there as well, but not visible in this view.

Referring first to FIG. 1a, there is shown a schematic side cross-sectional view of a typical inductive type PMR write head that is shielded in the manner provided by the present invention. This view shows rectangular cross-sections of the inductive coil windings as well as an upper yoke (16). The MP (10) is preferably formed of material having a high $B_s$, ranging from 2.2 T to 2.4 T and can be formed of magnetic materials such as NiFe, CoFe, CoNiFe, CoFePd, or CoFeN. The materials for the leading (LS) and trailing (WS1; PP3) shields (LS (20)), (WS1 (30); PP3(16)), including their seed layers, can also be made of any of these alloys and it is preferred that the material have a $B_s$ ranging from 1.5 T to 2.2 T. By using materials in these ranges, as compared to prior art materials in the range of approximately 1.0 T, the thicknesses of the TS and SS can be reduced by half, which will result in reduced pole tip protrusion (PTP) and improved head-media spacing margin.

Figure 1B:
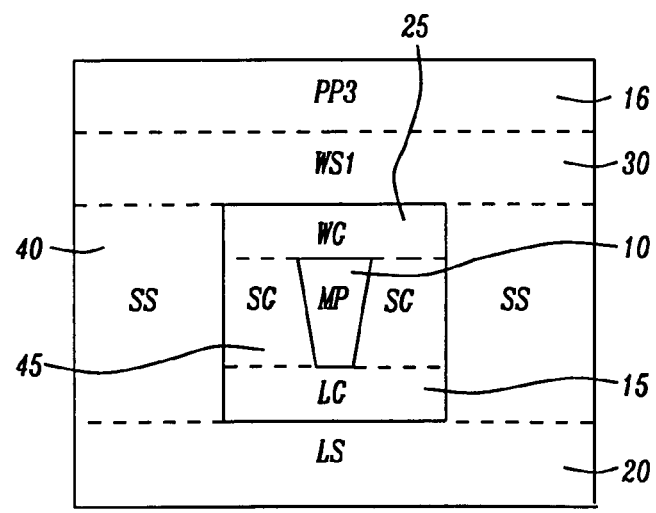
FIG. 1b is a schematic ABS view of the write head of FIG. 1a showing the main pole tip surrounded by the shields of the present invention at its trailing edge, leading edge and sides.

Referring next to FIG. 1b, there is shown the fabrication of FIG. 1a from the ABS perspective. There can now be clearly seen the symmetrically disposed side shields (SS) (40) and the side gap layers (45) separating the outside edge of the main pole (10) from the inner edge of the side shields. There is also clearly seen the write gap layer (25) separating the upper surface of the main pole (10) from the lower edge of the trailing shield, WS1 (30). Correspondingly, a lower gap layer (15) separates the upper edge of the leading shield (20) from the lower edge of the main pole (10). In this embodiment, each shield layer has a seed layer (not shown) that is formed of the same material as the shield layer itself.

Figure 2A:
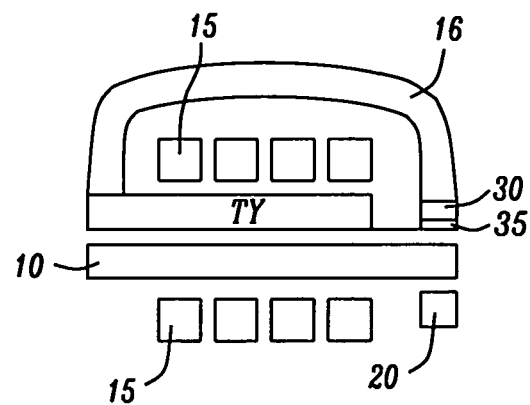
FIG. 2a is a schematic representation of a second embodiment of the present invention showing a side cross-sectional view of an inductive-type write head in which is seen a main pole surrounded by the shields of the present invention at its trailing edge and leading edge. This figure also shows a high $B_s$ seed layer that resides at the bottom of the trailing edge shield (WS1) just above the write gap (WG) layer. The side shields are also present, but not visible.

Referring now to FIG. 2a, there is shown a schematic side view of the same inductive type PMR write head of FIG. 1a that is now shielded in the manner provided by a second embodiment of the present invention. This embodiment differs from that described in FIG. 1a by the presence of a high $B_s$ (>2.0 T) seed layer (35) that is patterned to be just wide enough (in its lateral extent) to cover the write gap layer (25) as it extends laterally between the inner edge surfaces of the two side shields (see FIG. 2b).

Figure 2B:
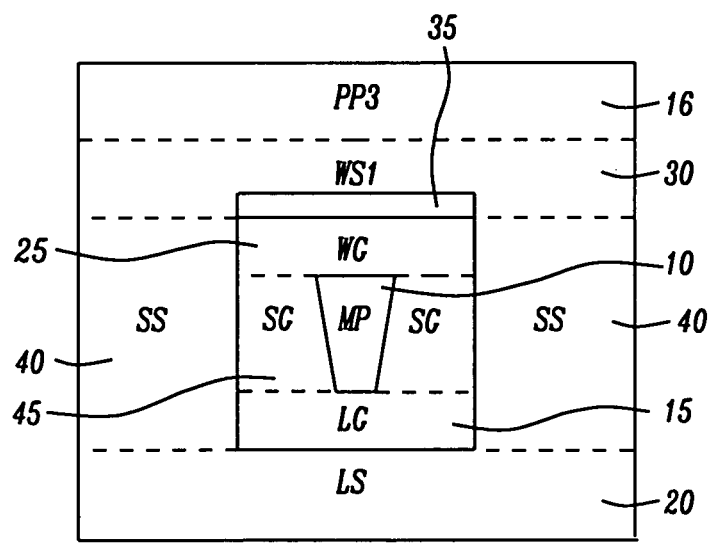
FIG. 2b is a schematic ABS view of the write head of FIG. 2a showing the main pole tip surrounded by the shields of the present invention at its trailing edge, leading edge and sides as well as the high $B_s$ seed layer.

Referring to schematic FIG. 2b, there is shown the high $B_s$ seed layer that is wide enough to cover the entire width (lateral extent) of the write gap layer (25). The write gap layer extends over the trailing edge of the main pole and the trailing edge surfaces of the two side gaps (45). This higher $B_s$ seed layer is first deposited along the entire write gap layer surface and the upper surfaces of the two side shields (40), which have all been properly planarized by a CMP process. The higher $B_s$ seed layer is then patterned by an IBE to form an extremely narrow layer as shown in the figure, extending only a short, lateral distance of approximately +/−0.3 microns to either side of the main pole. The use of a high $B_s$ seed layer in this position provides a high $B_s$ within a region of the trailing edge shield, WS1, layer precisely where it is required to improve the on-track field gradient along the trailing edge side of the track. The advantages of the identical shield layer and seed layer materials at all other locations except for this small portion (35) still hold true, but the additional advantages of the improved on-track field gradient can also be obtained. It should be noted that, while strictly speaking, the presence of the small high $B_s$ region of the trailing edge shield might be said to contradict the designation of the entire shield as being of the same material, the volume of shield material with high $B_s$ is so small compared to the volume of the entire shield, that all of the advantages and objects of the invention that result from the same shield materials being used are still met.

As in the embodiment of FIGS. 1a and 1b, the MP (10) is preferably formed of material having a high $B_s$ ranging from 2.2 T to 2.4 T and can be formed of magnetic materials such as NiFe, CoFe, CoNiFe, CoFePd, or CoFeN. The leading and trailing shields (LS (20)), (WS1 (30)) materials, including their seed layers, can also be made of any of these alloys and it is preferred that the material have a $B_s$ ranging from 1.5 T to 2.2 T. By using materials in these ranges, as compared to prior art materials in the range of approximately 1.0 T, the thicknesses of the TS and SS can be reduced by half, which will result in reduced pole tip protrusion (PTP) and improved head-media spacing margin.

Figure 3A:
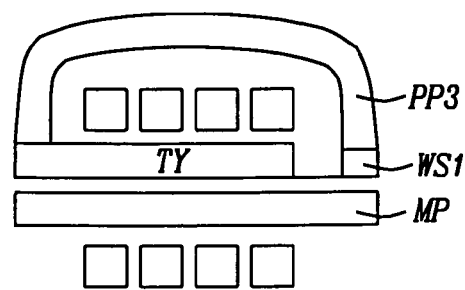
FIG. 3a is a schematic representation of a third embodiment of the present invention showing a side cross-sectional view of an inductive-type write head in which is seen a main pole surrounded by the shields of the present invention at its trailing edge but not at its leading edge. Side shields are present, but not visible in this view.

Referring next to FIG. 3a, there is shown the PMR write head of FIGS. 1a and 2a, except that there is no leading shield in this embodiment.

Figure 3B:
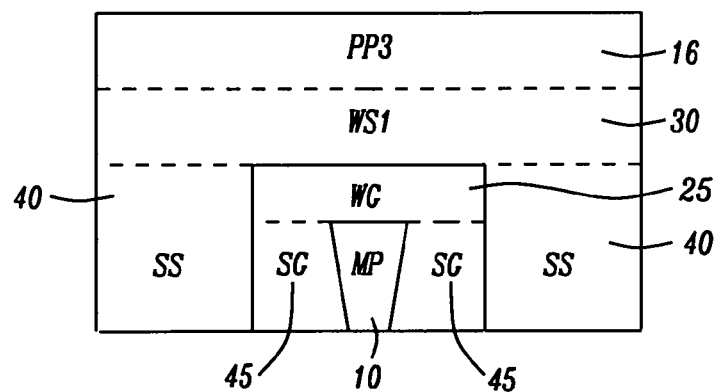
FIG. 3b is a schematic ABS view of the write head of FIG. 3a showing the main pole tip surrounded by the shields of the present invention at its trailing edge and sides.

Referring now to FIG. 3b, there is shown the fabrication of FIG. 3a from the ABS perspective where the leading edge shield is no longer formed. There can now be clearly seen the trailing edge shield (30), the write gap layer (25) that separates the main pole (10) from the trailing edge shield, WS1, (30), the side shields (SS) (40) and the two side gaps (45) separating the outside edge of the main pole (10) from the inner edge of the side shields.

Figure 4A:
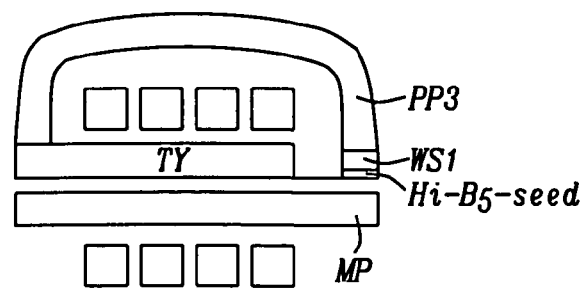
FIG. 4a is a schematic representation of a fourth embodiment of the present invention showing a side cross-sectional view of an inductive-type write head in which is seen a main pole surrounded by the shields of the present invention at its trailing edge and leading edge. As in the second embodiment, a high $B_s$ seed layer is below the trailing edge shield WS1.

Referring next to FIG. 4a, there is shown schematically the fabrication of FIG. 2a, except that there is no longer formed a leading shield.

Figure 4B:
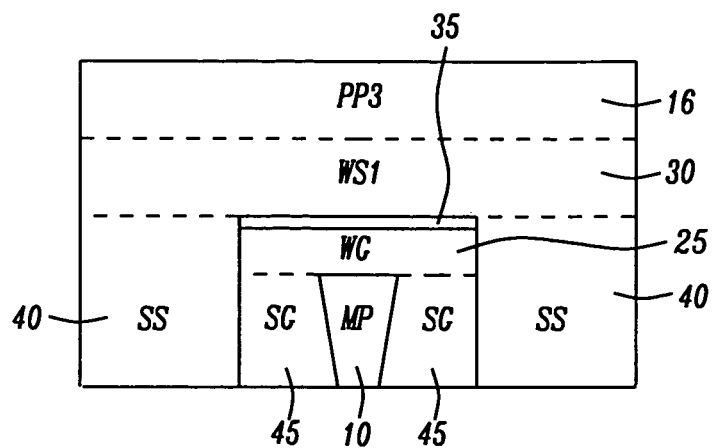
FIG. 4b is a schematic ABS view of the write head of FIG. 4a showing the main pole tip surrounded by the shields of the present invention at its trailing edge, leading edge and sides.

Referring next to FIG. 4b, there is shown schematically the fabrication of FIG. 4a, from an ABS perspective, where the leading edge shield is no longer formed. The "Hi-$B_s$ seed" layer, which is the seed layer of high $B_s$ material (35) is still present, as are all other elements of FIG. 2b.

Figure 5A:
FIGS. 5a-5h are a series of schematic illustrations displaying the process flow that can be employed for fabricating any of the embodiments illustrated above.

Referring now to schematic FIG. 5a, there is shown the first of a series of process steps through which the embodiments of the present invention can be fabricated. First, there is shown a substrate (100), which can be a layer of non-magnetic metal such as Ru or Ta, on which has been formed a dielectric layer (200) of $Al_2O_3$ to a thickness of between approximately 0.2 and 0.6 microns. The dielectric layer will be used as a form in which to plate the main pole of the write head.

Figure 5B:
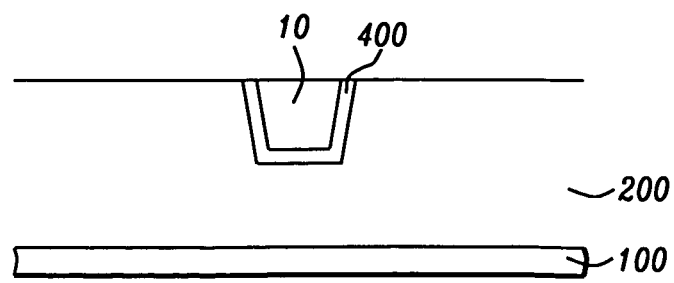

Referring to schematic FIG. 5b, there is shown the formation of a cavity in layer (200). The cavity is etched by a photolithographic and etching process, which can be an IBE. The shape of the cavity is congruent with the desired shape of the main pole to be plated within it. As we shall see, below, in FIG. 5f, the cavity can terminate at the substrate, which will enable the formation of a shielded pole that lacks the leading edge shield, or in this case, it can terminate within the body of the dielectric layer, to leave space for the formation of a leading edge shield.

The cavity is then lined on bottom and sides with a layer (400) of non-magnetic metal such as Ru or Ta. A main pole (10) is then plated within the lined cavity and the upper surface of the fabrication is planarized by a CMP process or the like. The main pole is preferably formed of material having a high $B_s$, ranging from 2.2 T to 2.4 T and it can be formed of magnetic materials such as NiFe, CoFe, CoNiFe, CoFePd, or CoFeN.

Figure 5C:
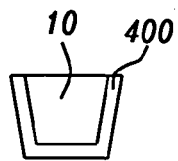
Figure 5C:

Referring next to schematic FIG. 5c, there is shown the fabrication of FIG. 5b, wherein the dielectric material layer ((200) in FIG. 5b), laterally disposed from the main pole (10) and beneath the main pole is removed by a wet etch, leaving behind the uncovered metallic substrate (100). The partially lined pole tip (lined on its sides and bottom), as shown, floats over the substrate, although it is supported behind the plane of the figure. Although it is not shown in the figure, the upper surface of the already plated pole can be protected by a mask during this wet etch process so that it is not damaged.

Figure 5D:
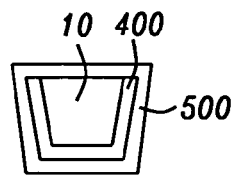
Figure 5D:

Referring next to schematic FIG. 5d, there is shown the fabrication of FIG. 5c in which any protective mask layer has been removed and an atomic layer deposition (ALD) process has been used to deposit a continuous gap layer (500), that is contiguous with the partially lined main pole. This layer, which can be a layer of Ru or $Al_2O_3$ will ultimately form (with its upper portion) a write gap layer ((25) in FIG. 5e) between the trailing shield and the main pole (10), side gap layers (45) in FIG. 5e) between the side shields and the main pole and a leading gap layer ((15) in FIG. 5e), between the leading shield and the main pole, if a leading shield is formed.

Figure 5E:
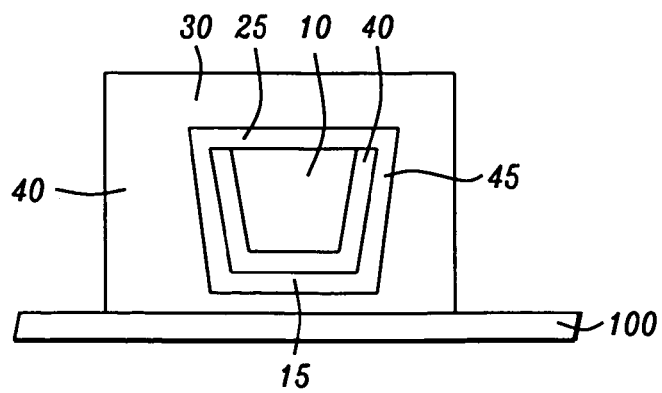

Referring now to FIG. 5e, there is shown schematically the result of a single plating step on the substrate (100) that forms the completely surrounding and continuous shield configuration. This shield configuration includes two side shield portions (40), a trailing shield portion (30) and a leading shield portion (20). The shield is separated from the main pole (10) by side gap layers (45), a write gap layer (25) and a leading gap layer (15), when the leading shield is present, as it is here.

As already noted, the MP (10) has been preferably formed of material having a high $B_s$ ranging from 2.2 T to 2.4 T and is formed of magnetic materials such as NiFe, CoFe, CoNiFe, CoFePd, or CoFeN. The materials forming the leading and trailing shields, including their seed layers, can also be made of any of these alloys and it is preferred that the material have a $B_s$ ranging from 1.5 T to 2.2 T. The shield configuration is substantially of uniform thickness (in the dimension normal to the ABS) because of the use of the same material in all of its portions.

Figure 5F:
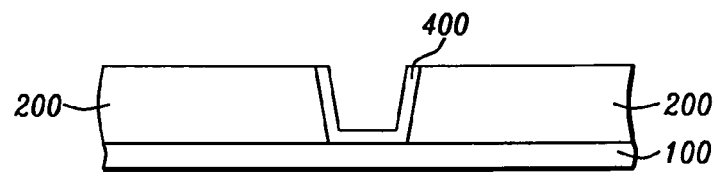

In an embodiment in which a leading edge shield is not to be formed, the fabrication can proceed by substituting FIG. 5f for FIG. 5a, forming the lined cavity for the MP plating in the layer (200) of so that it directly contacts the substrate material (100) (eg. the Ru or Ta metallic substrate).

Figure 5G:
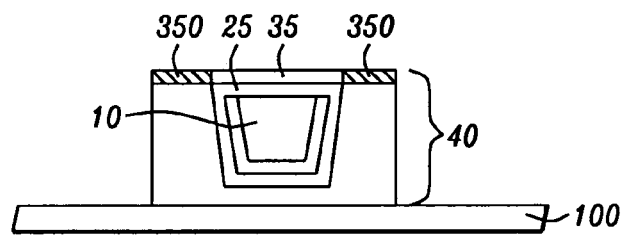

In an alternative embodiment, where it is desired to utilize a high $B_s$ seed layer as shown in FIGS. 2a and 2b and described above, it can be deposited on the top surface of the write gap layer at a point in the fabrication process before the completed plating as shown in FIG. 5e. This can be done as follows. Referring to FIG. 5g, there is shown the fabrication of FIG. 5e where the plating of the leading and side shields has been terminated where the side shields (40) have reached their correct height. At that point, the upper surface of the fabrication is planarized. Then a high $B_s$ seed layer is deposited over the upper surface and is patterned using an IBE (ion beam etch) to remove outer (shaded) portions (350) and to leave only a narrow central portion (35) extending laterally to each side of the main pole by, for example, +/−0.3 microns.

Figure 5H:
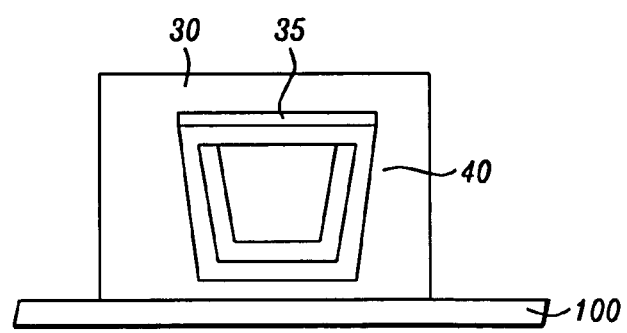

After the formation of the patterned seed layer (35) in FIG. 5g, the plating process is continued, as in FIG. 5h, to form the trailing edge shield (30) above and continuous with the side shields (40) and to thereby complete the surrounding shield configuration. It is understood that in this embodiment, also, the leading edge shield is optional.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a main pole-tip surrounded by a magnetic shield configuration formed of the same magnetic materials, while still forming and providing such a PMR head and pole and its method of formation in accord with the spirit and scope of the present invention as defined by the appended claims.

What is claimed is:

1. A PMR write head comprising:
a main pole;
a magnetic shield at least partially surrounding said main pole and formed in the ABS plane of said main pole, wherein said shield includes a trailing shield portion and a portion including two side shields, wherein
said side shield portions are formed of the same magnetic material and are formed using the same seed layers and form a substantially continuous structure with said trailing shield portion, and wherein
said side shield portions and said trailing shield portion are separated from said main pole by a substantially continuous non-magnetic layer, wherein said non-magnetic layer forms a write gap layer between a trailing edge of said main pole and an inner edge of said trailing shield portion and wherein said non-magnetic layer forms a side gap between side edges of said main pole and inner edges of said side shields; and wherein
a high $B_s$ seed layer is formed on said write gap layer between said write gap layer and a corresponding region of said trailing shield portion whereby said corresponding region is provided with said high $B_s$ and wherein said high $B_s$ is greater than the $B_s$ of said side shield portions and said trailing shield portion not within said corresponding region.

2. The PMR write head of claim 1 further including a leading shield portion formed beneath a leading edge of said main pole and continuous with said trailing shield portion and said side shield portions and wherein said leading shield portion is separated from said main pole by a leading edge gap that is formed as a portion of said non-magnetic layer.

3. The PMR write head of claim 2 wherein said leading and trailing shield portions and their seed layers, are formed of material having a $B_s$ ranging from 1.5 T to 2.2 T.

4. The PMR write head of claim 3 wherein said material is NiFe, CoFe, CoNiFe, CoFePd, or CoFeN.

5. The PMR write head of claim 1 wherein said high $B_s$ seed layer is formed to a width that extends laterally beyond said main pole by an amount of approximately +/−0.3 microns.

6. The PMR write head of claim 1 wherein a region of said trailing shield portion above said high $B_s$ seed layer is provided with a higher $B_s$ than other regions of said trailing shield portion thereby providing an improved on-track field gradient.

7. The PMR write head of claim 1 wherein said main pole is formed of material having a high $B_s$, ranging from 2.2 T to 2.4 T.

8. The PMR write head of claim 7 wherein said main pole is formed of NiFe, CoFe, CoNiFe, CoFePd, or CoFeN.

9. The PMR write head of claim 1 wherein said high $B_s$ seed layer is formed of material having a high $B_s$, that is greater than 2.0 T.

10. The PMR write head of claim 9 wherein said high $B_s$ material is NiFe, CoFe, CoNiFe, CoFePd, or CoFeN.

* * * * *